(12) United States Patent
Eggleton et al.

(10) Patent No.: US 7,440,664 B2
(45) Date of Patent: Oct. 21, 2008

(54) MICROSTRUCTURED OPTICAL WAVEGUIDE FOR PROVIDING PERIODIC AND RESONANT STRUCTURES

(75) Inventors: Benjamin J. Eggleton, Manly Vale (AU); Justin D. Ging, Jersey City, NJ (US); Arturo Hale, New York, NY (US); Charles Kerbage, Berkeley Heights, NJ (US)

(73) Assignee: Fitel USA Corp., Norcross, GA (US)

( * ) Notice: Subject to any disclaimer, the term of this patent is extended or adjusted under 35 U.S.C. 154(b) by 1139 days.

(21) Appl. No.: 10/409,227

(22) Filed: Apr. 8, 2003

(65) Prior Publication Data

US 2004/0202438 A1    Oct. 14, 2004

(51) Int. Cl.
*G02B 6/02* (2006.01)

(52) U.S. Cl. .......................... 385/125; 385/43
(58) Field of Classification Search ................ 385/125
See application file for complete search history.

(56) References Cited

U.S. PATENT DOCUMENTS

| | | | |
|---|---|---|---|
| 5,626,797 A * | 5/1997 | Miyata et al. ............... 252/582 |
| 5,802,236 A * | 9/1998 | DiGiovanni et al. ........ 385/127 |
| 5,833,896 A | 11/1998 | Jacobs et al. |
| 6,415,079 B1 | 7/2002 | Burdge et al. |
| 6,418,258 B1 | 7/2002 | Wang |
| 6,445,862 B1 | 9/2002 | Fajardo et al. |
| 6,707,957 B1 * | 3/2004 | Reynolds et al. ............... 385/11 |
| 6,802,236 B1 * | 10/2004 | DiGiovanni et al. ........ 385/127 |

| | | | |
|---|---|---|---|
| 2002/0114574 A1 * | 8/2002 | Chandalia et al. ............. 385/48 |
| 2003/0031443 A1 * | 2/2003 | Soljacic et al. .............. 385/125 |

FOREIGN PATENT DOCUMENTS

EP    1 199 582 A1    4/2002

OTHER PUBLICATIONS

C. Kerbage, B. J. Eggleton, "Tunable Microfluidic Optical Fiber Gratings", Applied Physics Letters, American Institute of Physics, New York, US, vol. 82, No. 9, Mar. 3, 2003 pp. 1338-1340.
C. Kerbage, B. J. Eggleton, "Microstructured Optical Fibers for Integrated Tunability of Photonic Devices" Optics and Photonics, OSA, Washington, DC, US vol. 13, No. 9, Sep. 2002, pp. 38-42.

* cited by examiner

Primary Examiner—David A. Vanore
Assistant Examiner—Phillip A. Johnston
(74) Attorney, Agent, or Firm—Wendy W. Koba

(57) ABSTRACT

A microstructured optical waveguide is formed to include a periodic sequence of "plugs" of optically active material within the inner cladding air tunnels. The plugs are utilized as a grating structure for generating resonant and periodic structures. The waveguide (in one embodiment, an optical fiber) is tunable by changing the spacing of the plugs (e.g., heating the structure, changing the pressure within the structure, etc.), or by modifying the initial spacing of the plugs during the formation of the microstructured optical waveguide (i.e., by modifying the "dipping frequency" of the waveguide into a reservoir of optically active material). In general, any number of different types of optically active material may be used to form the plugs, where two or more different materials may be used in the same structure, and introduced in an alternating fashion.

16 Claims, 6 Drawing Sheets

MICROSTRUCTURED OPTICAL WAVEGUIDE FOR PROVIDING PERIODIC AND RESONANT STRUCTURES

FIELD OF THE INVENTION

The present invention relates to microstructured optical waveguide elements and, more particularly, to the inclusion of periodic "plugs" of optically active material in the cladding structure of an optical waveguide, such as a fiber, to provide tunable periodic and resonant structures.

BACKGROUND OF THE INVENTION

Optical devices that modify the properties of optical signals include devices such as tunable filters, attenuators, switches, polarization rotators and the like. Such devices use various means to periodically vary the refractive index of one or more regions of the device to change the phase/amplitude of a signal propagating through the device. Conventional devices of this kind include structures such as Bragg gratings and/or long period gratings to introduce the desired periodicity. Typically, conventional gratings are periodic perturbations in the photosensitive refractive index of the core of the optical fiber or waveguide. These gratings are created by UV exposure and are thus permanent in nature. Tuning of the applicable wavelength range may be achieved, for example, by introducing physical strain variations in the grating, temperature variations, magnetic field variations, or other environmental methods of inducing physical changes in the grating.

In a different scheme, it is desirable to have available an all-fiber device in which a periodic structure of a certain desired material (fluid/polymer/microspheres) is introduced into the fiber without the need for hydrogen loading or a photosensitive core. The introduction of the optically active material thus eliminates the need to use UV laser sources to write the grating structure, which is considered to save a significant amount of time and effort. Moreover, the choice of the active material's refractive index gives an additional degree of freedom in determining the difference in the refractive index perturbation, which is usually desired to be as large as possible so that coupling between different modes or different polarizations of one mode can be achieved in a relatively short coupling length.

SUMMARY OF THE INVENTION

The needs remaining in the prior art are addressed by the present invention, which relates to microstructured optical waveguide elements and, more particularly, to the inclusion of periodic "plugs" of optically active material in the cladding structure of an optical waveguide to provide tunable periodic and resonant structures.

In accordance with the present invention, selected air channels within a microstructured optical waveguide, such as an optical fiber, are periodically filled with optically active material so as to manipulate the evanescent fields (propagation constants, polarization, etc) of light propagating along the guide/fiber. In a particular embodiment, the air channels are introduced in the cladding region so as to surround the core region and extend in the axial direction along the length of an optical fiber. Optically active material is then infused in one or more of the cladding layer air channels to change the optical properties of a propagating optical signal, where the active material is infused using a "periodic" process so as to create separate, periodic "plugs" of optically active material disposed along the length of the air channel. The active material is infused so as to exhibit a period A, similar to well-known grating structures. The periodicity may be used in accordance with the present invention to provide coupling between the different polarizations of the propagating mode and create a polarization rotator.

Tunability of the transmission properties within the microstructured optical fiber can be achieved by changing the periodicity of the optically active material, such as by heating the air in the channels on both ends of a tapered microstructure fiber section, so as to induce pressure on both sides of the periodic structure, which results in compressing the air between the plugs and changing the period of the microfluidic structure. As an alternative to an air/active material periodicity in the cladding, two different optically active materials may be infused periodically, with each material exhibiting different optical properties (e.g., one material with a dn/dT>0, and another material with a dn/dT <0).

In accordance with the operation of the present invention, the application of, e.g., temperature, light or an electric or magnetic field will vary the optical properties such as refractive index, loss, scattering, or birefringence of the active material, which in turn varies or affects the propagation properties of optical signals in the device.

Other and further aspects and embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
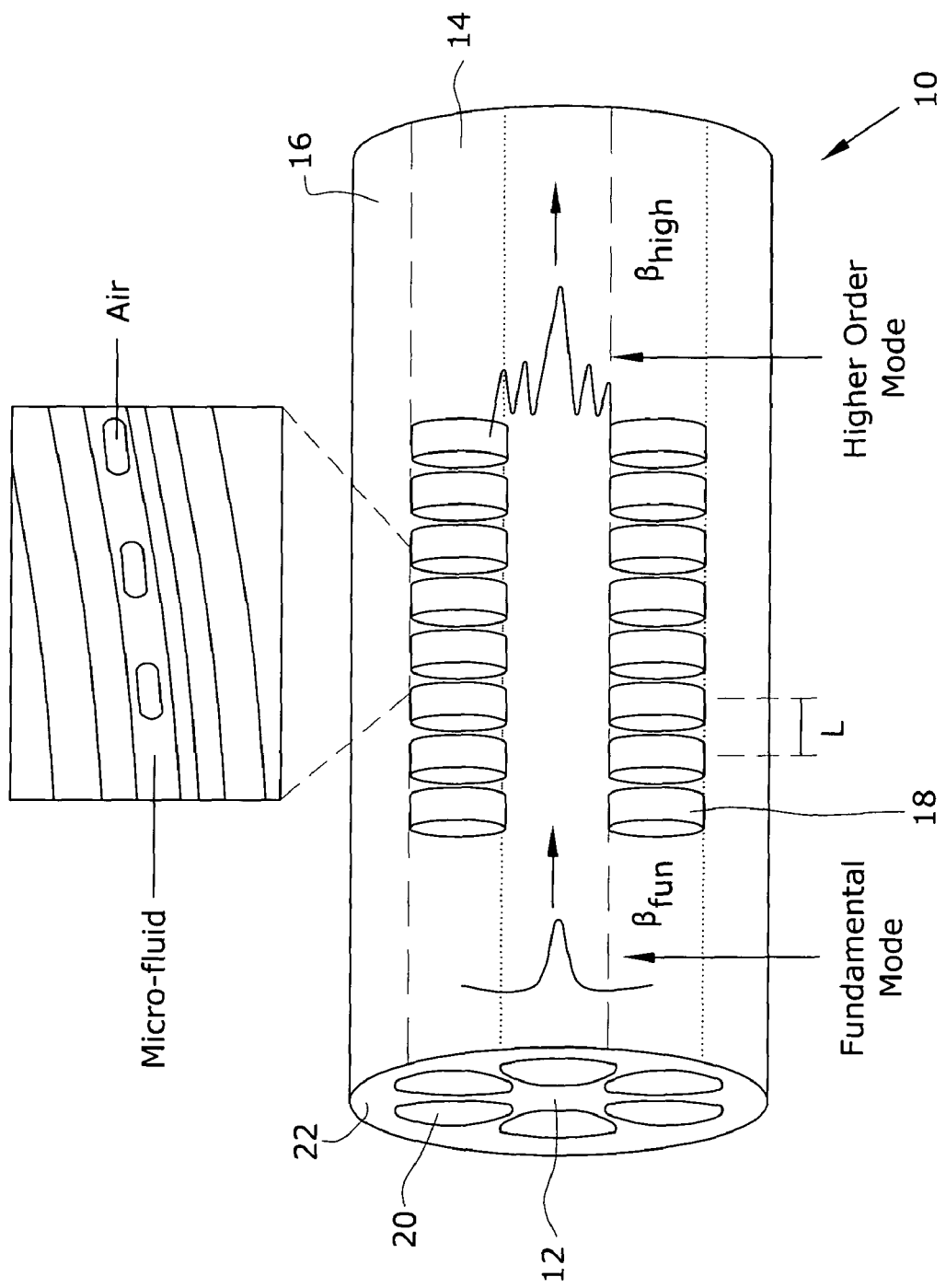
FIG. 1 contains a diagram of an exemplary microstructured optical fiber including periodically infused active material in accordance with the present invention.

The principle of coherent microfluids resonance can best be understood by reference to the microstructure optical fiber 10 of FIG. 1. As shown, fiber 10 comprises a core region 12 surrounded by an inner cladding layer 14 and an outer cladding layer 16. As will be described in detail below, inner cladding layer 14 comprises a periodic disposition of an optically active material 18, active material 18 being in this example disposed within a plurality of separate air channels 20 axially disposed so as to surround core region 12 and extend along the length of fiber 10. An important factor in the tenability of the structure of the present invention is the periodic disposition of active material 18 within channels 20, where separate "bubbles" or "plugs" of active material 18 (see photograph associated with FIG. 1) are formed to exhibit a period of Λ. As will be discussed in detail below, the presence of periodically-spaced active material plugs 18 causes phase matching between the propagating fundamental mode and higher order modes. To achieve coupling between co-propagating waveguide modes, phase matching needs to satisfy the following relationship:

$$\beta_{fun} - \beta_{high} = 2\pi/\Lambda,$$

where $\beta_{fun}$ and $\beta_{high}$ are the propagation constants of the fundamental and higher order modes, respectively, and $\Lambda$ is the period of the active material sections 18, as illustrated in FIG. 1. In microstructured optical fiber 10, the evanescent field of the fundamental mode overlaps with channels 20 of inner cladding 14, as shown in FIG. 1, and therefore passes through active material 18 which functions to provide coupling to the higher order mode. When the two modes are phase matched, optical power is exchanged between them. The amount of light transferred into the higher order mode at certain wavelengths is related to the coupling coefficient.

The coupling coefficient depends on the index difference in the periodic structure and the overlap between the mode fields $E_{fun}$ and $E_{high}$ through the following:

$$\kappa = \iint \omega \epsilon_0 / 2 (\Delta n)^2 E_{fun}(x) E_{high} dA$$

As will be described below, the refractive index of one exemplary optically active material (trifluorotoluence) is 1.405, so that the index difference between the fluid and the air in each channel 20 gives rise to an index difference $\Delta n = 0.405$. Although the index difference is much larger than the index changes obtained in photosensitive optical fiber gratings, the coupling coefficient $\kappa$ is related to the overlap of the fundamental and higher order mode. The calculated coupling coefficient $\kappa$ for a conventional fiber with similar dimensions as that inner cladding of the fiber as described below is on the order of approximately $1 \times 10^{-5}/\mu m$, which is approximately the same order of magnitude as in a conventional long period grating. It is to be noted that while the exemplary embodiment discussed herein utilizes a microstructured optical fiber, the principles of the present invention are equally applicable for use with any microstructured optical waveguiding arrangement, such as a slab optical waveguide.

Figure 2:
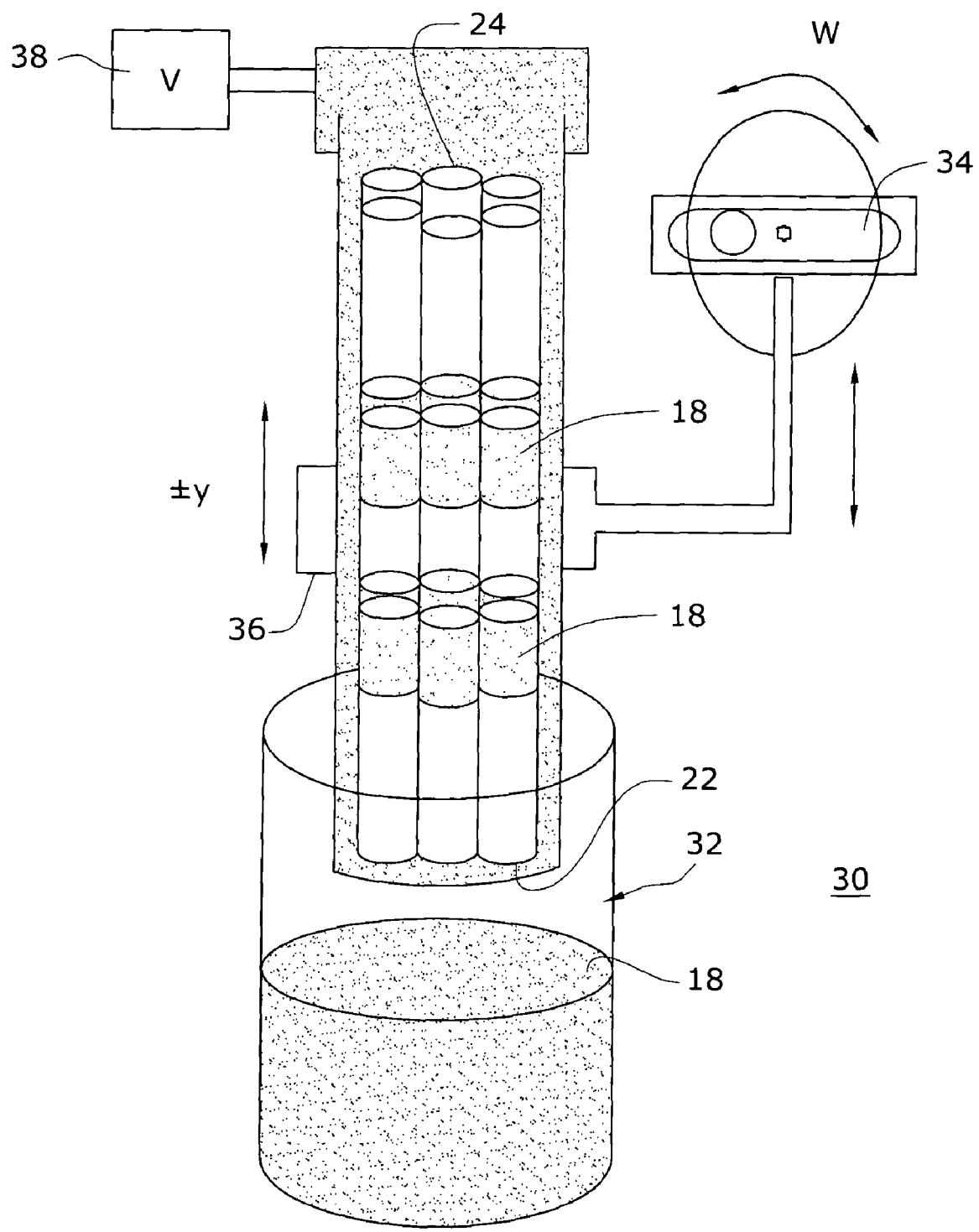
FIG. 2 illustrates an exemplary arrangement useful in forming the periodic microstructured optical fiber of the present invention.

FIG. 2 illustrates a particular apparatus that may be used to form a periodic microstructure optical fiber, such as fiber 10 of FIG. 1. As shown, apparatus 30 comprises a fluid reservoir 32 filled with optically active material 18. A motor 34 is coupled to a clamping apparatus 36, where clamping apparatus 36 is attached (as shown) to an outer housing surrounding fiber 10. The motion of motor 34 is redirected through clamping apparatus 36 to provide periodic linear dipping (illustrates as ±y in FIG. 2) of endface 22 of fiber 10 into fluid reservoir 32. A vacuum pump 38 is attached to opposing endface 24 of fiber 10 such that as a vacuum is applied via endface 24, fluid plugs 18 and air (alternating) are drawn into each channel 20 of fiber 10. The period Λ of fluid plugs 18 is controlled, in this particular example, by adjusting the rotational frequency ω of motor 34. The ratio of fluid to air can also be controlled by adjusting the displacement of fiber 10 into fluid 18, as compared to the displacement of fiber in air during one cycle. A microstructured optical slab waveguide may be similarly clamped within such apparatus to form a periodic disposition of active material within the cladding layers of the waveguide structure.

Figure 3:
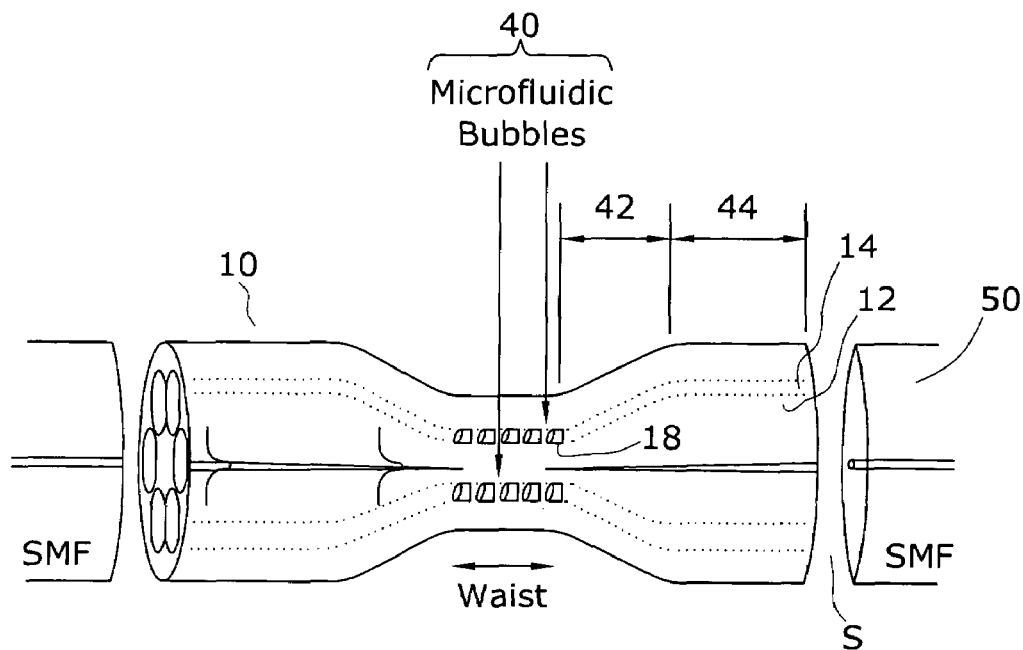
FIG. 3 illustrates a tapered section of microstructured optical fiber including periodic optically active plugs, the taper used to provide coupling of the input optical signal into the cladding layer including the plugs.

In the particular embodiment of fiber 10 as described thus far, fiber 10 comprises a set of six approximately cylindrical channels (in this case, "tubes") 20 within inner cladding layer 14. In a fiber that comprises an 8 μm, germanium-doped core region 12, the propagating light signal will not interact with active plugs 18 in cladding layer 14. In order to achieve interaction between light propagating in the fiber and active plugs 18, fiber 10 needs to be tapered and stretched, as shown in FIG. 3, to create a tapered region 40. Within tapered region 40, the mode field expands into cladding layer 14 and thus becomes affected by active plugs 18.

As shown in FIG. 3, fiber 10 has been tapered in region 40 to a waist outer diameter of approximately 30 μm (inner diameter of approximately 8 μm) over a length of 7 cm. Periodic microfluidic plugs 18, in this example trifluorotoluence, are spaced with a period Λ of approximately 460 μm. As discussed above, light propagating in tapered region 40 will spread out of core region 12 and interact with periodic plugs 18. Coherent coupling is thus achieved between the fundamental mode ($LP_{01}$) and the higher order mode ($LP_{02}$) by virtue of the presence of periodic plugs 18. The generated higher order mode then propagates through the adiabatic up-tapered section 42 and transforms undisturbed into the section 44 of inner cladding layer 14. Although the higher order mode is guided in inner cladding 14, it will be attenuated when it reaches a splice S with a section of conventional single mode fiber 50. The resonant coupling to the higher order mode thus manifests itself in a resonant loss peak centered at a wavelength governed by the period and the propagation constants of the respective modes. In order to obtain coupling at a desired wavelength, the required period of the perturbation is given by the first above-described equation and is based on the knowledge of the effective indices of the respective core and higher order modes; the latter can be calculated using conventional beam propagation methods. The calculated difference between the effective indices of the $LP_{01}$ and $LP_{02}$ modes ($\Delta n^{eff}_{01-02}$=0.0045, assuming that no fluid is present in the air gaps, and suggests a period of 435 μm for resonant coupling around 1.5 μm. It is to be noted that the effective indices are affected by the presence of plugs 18 in channels 20 by virtue of the interaction of the evanescent fields with the optically active material of plugs 18.

Figure 4:
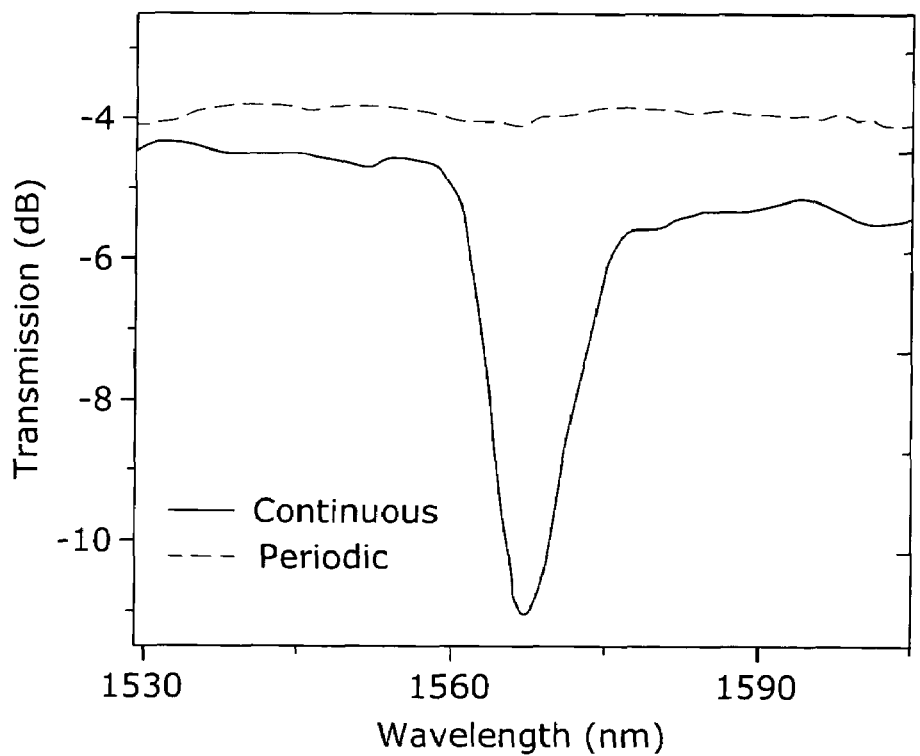
FIG. 4 contains the transmission spectra for both a microstructured optical fiber including periodic plugs, as formed in accordance with the present invention, and a microstructured optical fiber including a continuous-filled cladding structure.

FIG. 4 illustrates the transmission spectra for both a fiber with periodic microfluidic plugs (such as plugs 18), as well as for a continuous fluid-filled inner cladding region. Curve A illustrates the transmission over a wavelength range of 1530 nm to 1600 nm for a continuous filled fiber, showing very little difference in transmission as a function of wavelength. In contrast, curve B illustrates the transmission for a structure with a periodic plug structure, where in this case, a significant loss (filtering effect) is introduced at a wavelength of approximately 1565 nm.

Figure 5:
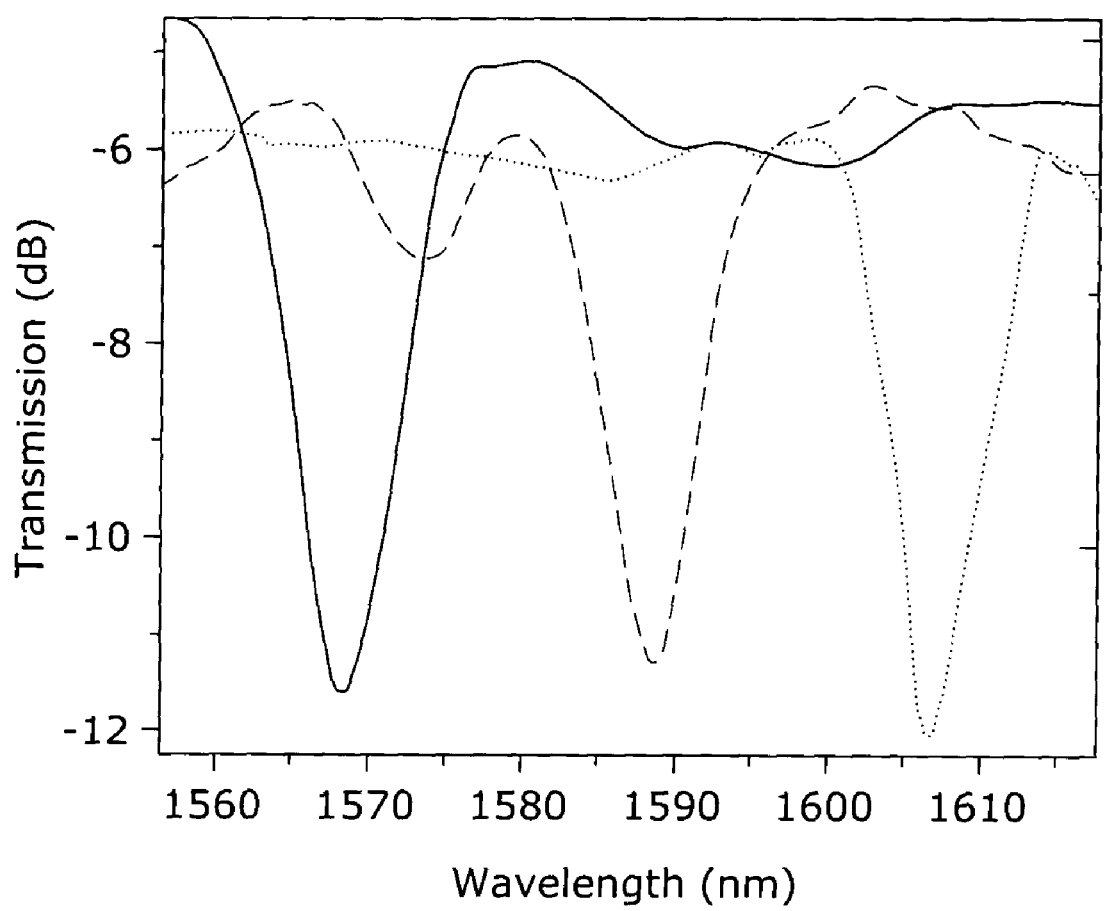
FIG. 5 contains the transmission spectra for a set of three microstructured optical fibers including periodic plugs of optically active material, each spectrum associated with a different "dipping frequency" (i.e., a different resultant periodicity of the plugs)

FIG. 5 shows the experimentally measured transmission spectra associated with different dipping frequencies, as discussed above in association with FIG. 2. As mentioned above, the period Λ of the optically active material plugs in the fiber cladding channels is determined by the dipping frequency, that is, the number of times (n) the fiber is dipped into a reservoir of optically active material during a time interval (t), as well as the velocity (v) in which the microfluidic plugs travel along the tube. During each time interval t, the fluid fills a certain distance determined by the velocity, which may be (for example) 1 cm/sec, as the fluid is being infused. Thus, for a dipping frequency of 125 Hz, the period Λ of the fluid in the fiber will be approximately 80 μm. In a tapered fiber section (such as section 40 shown in FIG. 3), the period will increase by a predetermined factor, which is the ratio of the tapered fiber diameter to that of the un-tapered section. In the arrangement of FIG. 3, the tapered diameter is one-fourth that of the non-tapered fiber, so that the period will increase to about 460 μm. The calculated period inferred from the above equation and that observed may be slightly different since the infusion of the fluid into the fiber is extremely sensitive to any change in the frequency of the motor, or the amount of dipping the fiber into the fluid. Further, the resonance position on the transmission spectrum is very susceptible to the difference in the effective indices.

Figure 6:
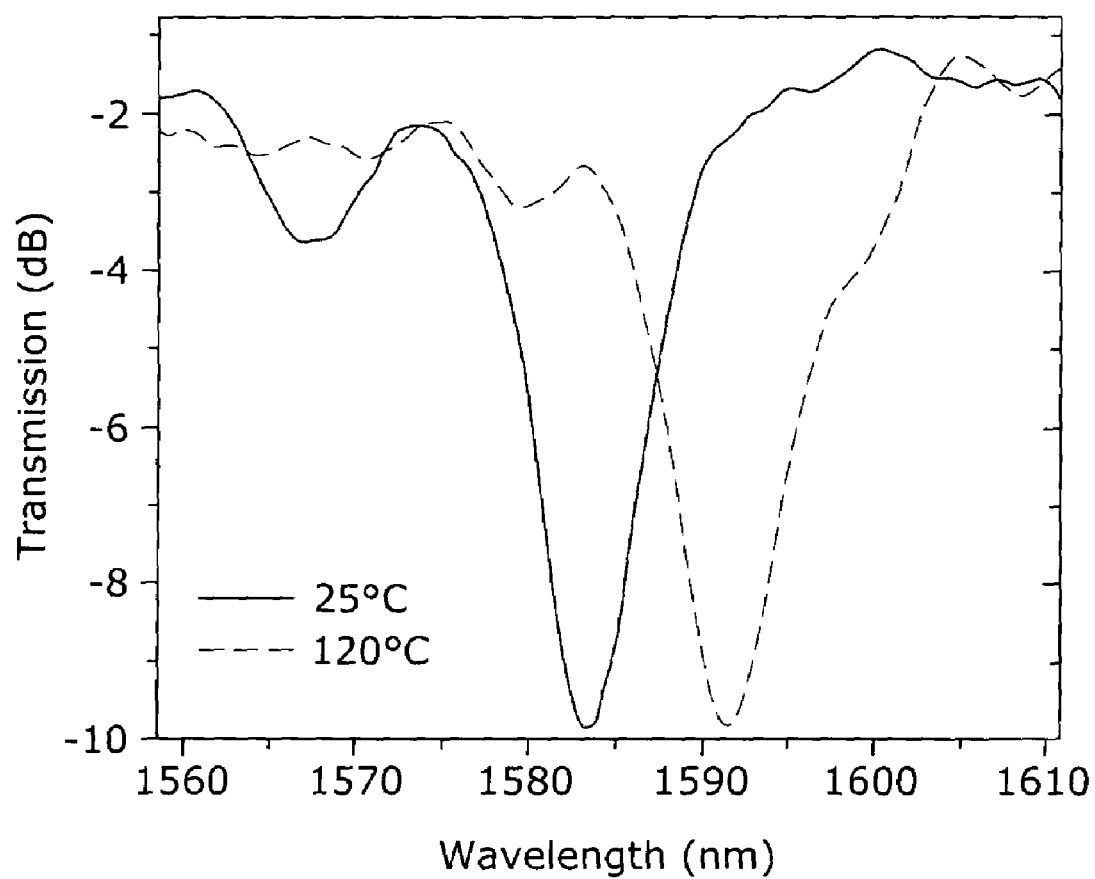
FIG. 6 contains the transmission spectra for an exemplary microstructured optical fiber including periodic plugs in accordance with the present invention, each spectrum associated with a different ambient temperature for the fiber.

In accordance with the practice of the present invention, the period Λ of plugs 18 can be "tuned" by simultaneously heating the air in channels 20 on both sides of tapered region 40. The heated air applies pressure on both sides of the periodic microfluidic plugs 18, causing the air gap between plugs 18 to shrink and thus decrease the separation between adjacent plugs 18 (decreasing the period Λ). FIG. 6 illustrates the effect of temperature changes on a microstructured optical fiber including periodic plugs in accordance with the present invention. Curve A in FIG. 6 shows the transmission spectrum for a fiber such as fiber 10 when the end portions are maintained at 25° C. In this case, the transmission spectrum contains a notch at a wavelength just above 1590 nm. By heating both ends of fiber 10 to 125° C., the center wavelength of the device will shift downward to a value of approximately 1583 nm, as a result of the decreased period of plugs 18 after heating. Therefore, by controlling the temperature applied to both ends, wavelength tuning can easily be achieved.

Figure 7:
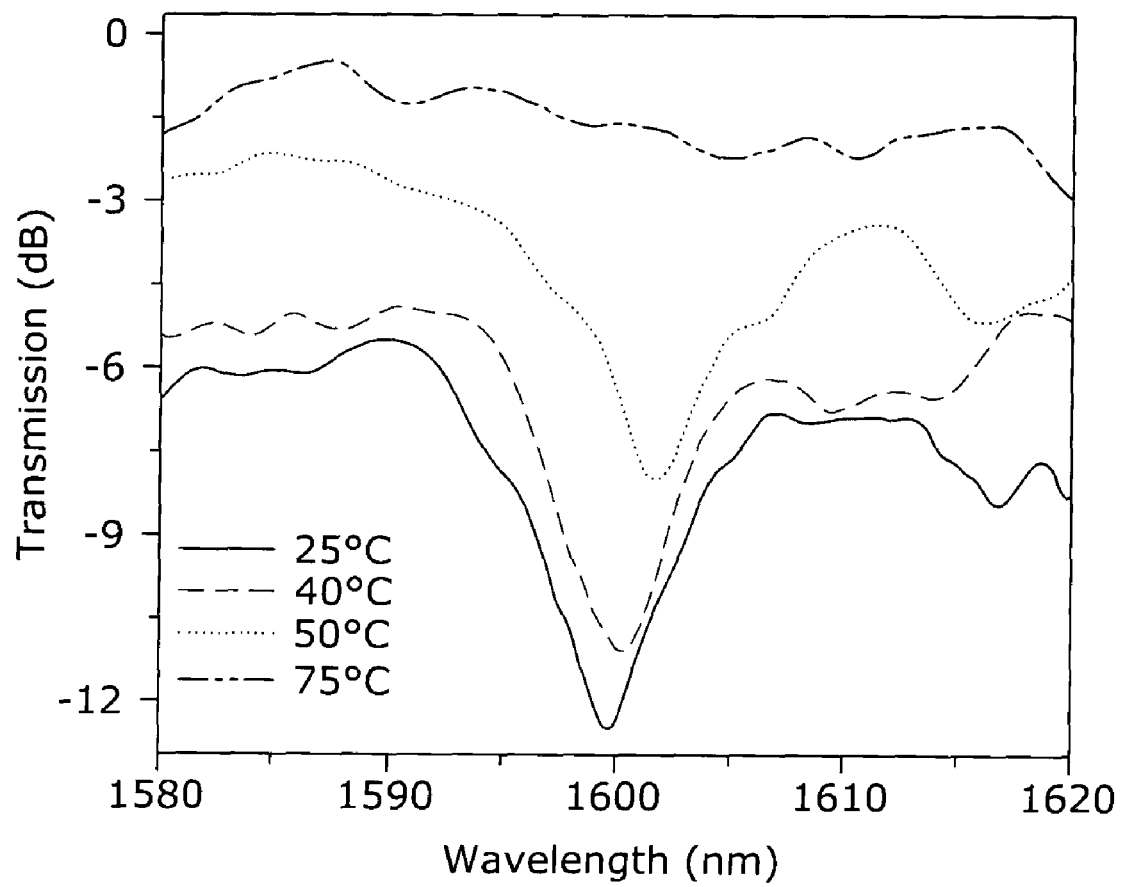
FIG. 7 contains a series of transmission spectra for an exemplary microstructured optical fiber including periodic plugs in accordance with the present invention, each associated with a different temperature for the tapered fiber section including the plugs.

FIG. 7 illustrates a set of different transmission spectra measured after directly heating plugs 18 within tapered section 40 of an exemplary fiber 10. In this case, the optically active material's refractive index exhibited a decrease with increasing temperature (dn/dT of approximately $-10^{-4}/°$ C.). Therefore, the coupling efficiency is reduced since the difference between the refractive indices of the fluid and air (Δn) becomes smaller. Curve A illustrates a sharp resonance at room temperature (25° C.), which becomes weaker at higher temperatures. It is also to be noted that the background loss decreases with temperature. This is to be expected since the average loss over the entire tapered section decreases. The resonance tends to shift toward higher wavelengths as the periodic plugs are heated, since the air between the plugs tends to expand and the increases the period of the grating structure formed by the plugs.

In essence, the present invention discloses periodically-spaced microfluidic plugs disposed in channels along the inner cladding layer of a microstructured optical waveguide, such as an optical fiber. Coherent resonance structures can therefore be formed within such a waveguide, where the resonance condition is controlled by adjusting the period of the active material plugs (in one example, by adjusting the "dipping frequency") or heating the waveguide/fiber on either side of the tapered central region. Moreover, the resonance may be attenuated by heating a fluid whose refractive index varies as a function of temperature. Various and other modifications may be made to the microstructured optical fiber as discussed above, where such modifications are considered to fall within the spirit and scope of the present invention as defined by the claims hereinbelow.

What is claimed is:

1. A microstructured optical waveguide comprising a central core region disposed along the length thereof; and an inner cladding layer surrounding said central core region, said inner cladding layer being microstructured to include at least one air channel disposed along the length of said waveguide, wherein said at least one air channel comprises a first plurality of plugs of optically active material disposed along a portion of the length of said waveguide, said first plurality of plugs thereby exhibiting a desired periodicity Λ.

2. The microstructured optical waveguide as defined in claim 1 wherein the at least one air channel comprises a plurality of air channels disposed peripherally to surround the core region, wherein at least two, opposing air channels each include a first plurality of plugs of optically active material.

3. The microstructured optical waveguide as defined in claim 1 wherein at least one air channel includes a second plurality of plugs of an alternative optically active material, said alternative optically active material exhibiting different optical characteristics than the optically active material of the first plurality of plugs.

4. The microstructured optical waveguide as defined in claim 3 wherein the first plurality of plugs of optically active material exhibits a refractive index that decreases with increasing temperature and the second plurality of alternative optically active material exhibits a refractive index that increases with increasing temperature.

5. The microstructured optical waveguide as defined in claim 1 wherein the periodicity of the plugs is tunable by modifying an environmental factor that alters the spacing of the plugs within the air channel.

6. The microstructured optical waveguide as defined in claim 5 wherein opposing ends of said waveguide are subjected to a temperature change to alter the spacing of the plugs.

7. The microstructured optical waveguide as defined in claim 5 wherein opposing ends of the waveguide are subjected to a pressure change to alter the spacing of the plugs.

8. The microstructured optical waveguide as defined in claim 1 wherein the optically active material comprises a liquid.

9. The microstructured optical waveguide as defined in claim 8 wherein the liquid comprises trifluorotoluence.

10. The microstructured optical waveguide as defined in claim 1 wherein the waveguide comprises an optical fiber.

11. The microstructured optical waveguide as defined in claim 1 wherein the waveguide comprises an optical fiber including a tapered region to allow for coupling of a propagating signal between the central core region and the inner cladding layer.

12. The microstructured optical waveguide as defined in claim 11 wherein the tapered region comprises an adiabatically tapered region.

13. A method of forming a microstructured optical waveguide including a plurality of plugs of optically active material in at least one air channel disposed along the length of an inner cladding layer, the method comprising the steps of:
    a) supplying a reservoir of optically active material;
    b) attaching a vacuum source to a far end of the microstructured optical waveguide;
    c) lowering the opposing, near end of said microstructured optical waveguide into the reservoir of optically active material for a defined period of time;
    d) applying a vacuum to draw an amount of optically active material into at least one inner cladding air channel;

e) removing said microstructured optical waveguide from said reservoir; and f) repeating steps c)-e) until a desired plurality of plugs of optically active material have been introduced into said microstructured optical waveguide.

14. The method as defined in claim 13 wherein the frequency of steps c)-e) is controlled to determine the periodicity $\Lambda$ of the plugs in the microstructured optical waveguide.

15. The method as defined in claim 13 wherein the method further comprises the steps of heating and stretching the final microstructured optical waveguide to form a central tapered region.

16. The method as defined in claim 15 wherein the heating and stretching are controlled to form adiabatic transition regions into and out of the central tapered region.

* * * * *